Aug. 8, 1961 M. GOLAND 2,995,036
APPARATUS FOR MEASURING FLUID MASS FLOW
Filed Jan. 6, 1958 2 Sheets-Sheet 1

MARTIN GOLAND
*INVENTOR.*

BY

ATTORNEY

MARTIN GOLAND
INVENTOR.

2,995,036
APPARATUS FOR MEASURING FLUID MASS FLOW
Martin Goland, San Antonio, Tex., assignor, by mesne assignments, of one-half to Humble Oil and Refining Company, and one-half to Black, Sivalls & Bryson, Inc.
Filed Jan. 6, 1958, Ser. No. 707,225
4 Claims. (Cl. 73—194)

This invention relates to methods and devices for the measurement of fluid flow. More particularly, the present invention relates to methods and measurement of fluid flow in terms of mass by devices commonly termed mass flow meters.

Prior devices capable of measurement of flow in terms translatable into mass rate of flow are designated velocity-density meters. These devices measure velocities and densities separately to be combined to provide a mass rate indication. The velocity-density meters have the disadvantage of being subject to the cumulative inaccuracy of both measurements. Therefore, a single measurement of the product of fluid density and fluid velocity would be more accurate. Also, the separate measurements of velocity and density would have to have identical frequency response for accurate measurement of fluctuations encountered during transient or pulsating flows. A high frequency density measurement is virtually impossible. Velocity measurement under such conditions may be obtained but only by complex equipment. Also, these velocity-density systems gain in complexity by virtue of the need for two independent measurements.

A true mass flow meter measures the product of the velocity and the density of a fluid stream. Therefore, the primary object of the present invention is to provide a method and an apparatus for instantaneous and cumulative measurement of the mass rate of fluid flow.

Another important object of the present invention is to provide a mass flow meter which gives an indication of the mass flow with an electric signal. A further object of the present invention is to provide an improved method of mass measurement of fluids flowing in a duct such as an oil pipeline and a natural gas pipeline. A still further object of the present invention is to provide an improved method of measurement of the mass flow of fluids which would be capable of accuracies within less than one percent.

Another object of the present invention is to provide a mass flow meter device having sturdy construction which may be inserted into a pipe or duct to indicate the mass flow without providing extensive straight sections or meter runs.

Figure 1:
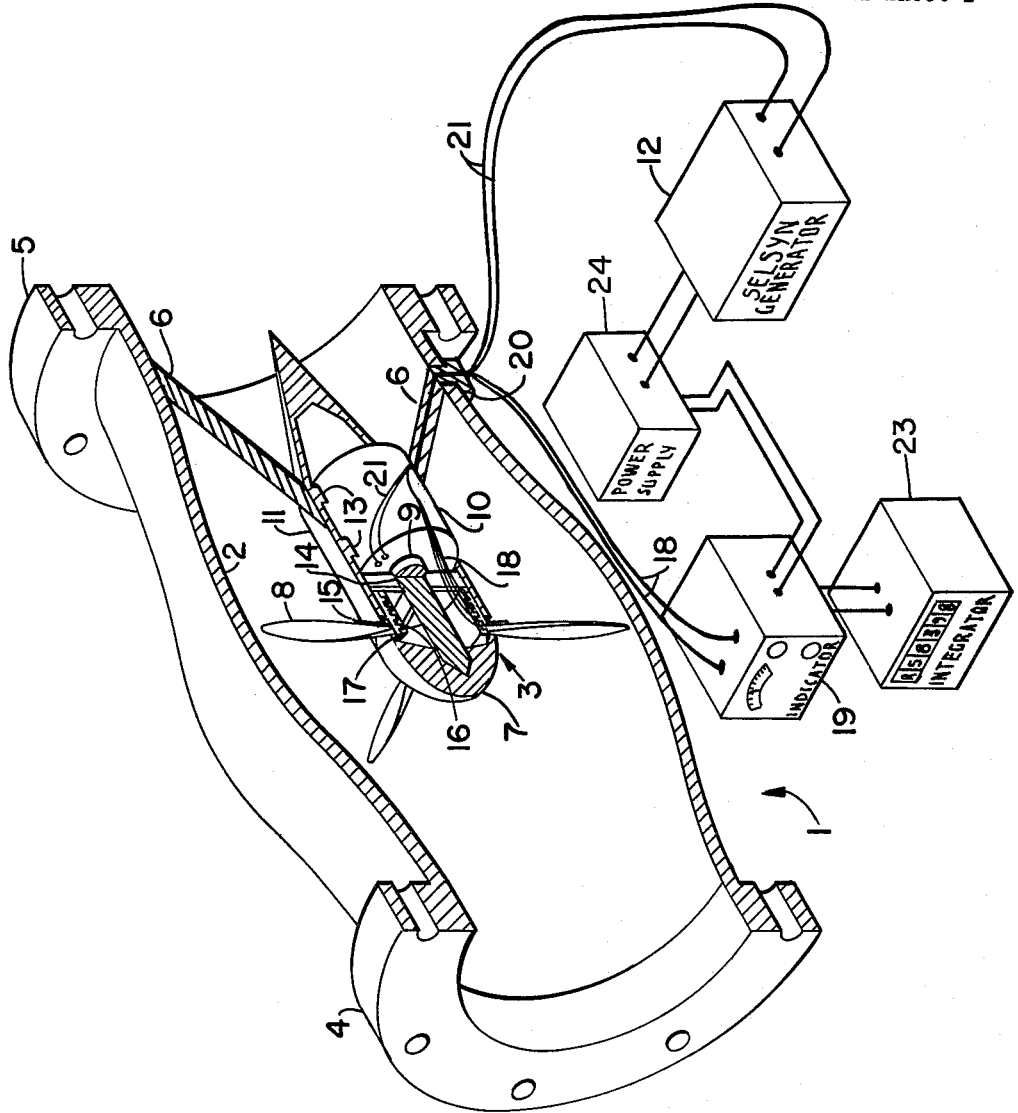
Figure 2:
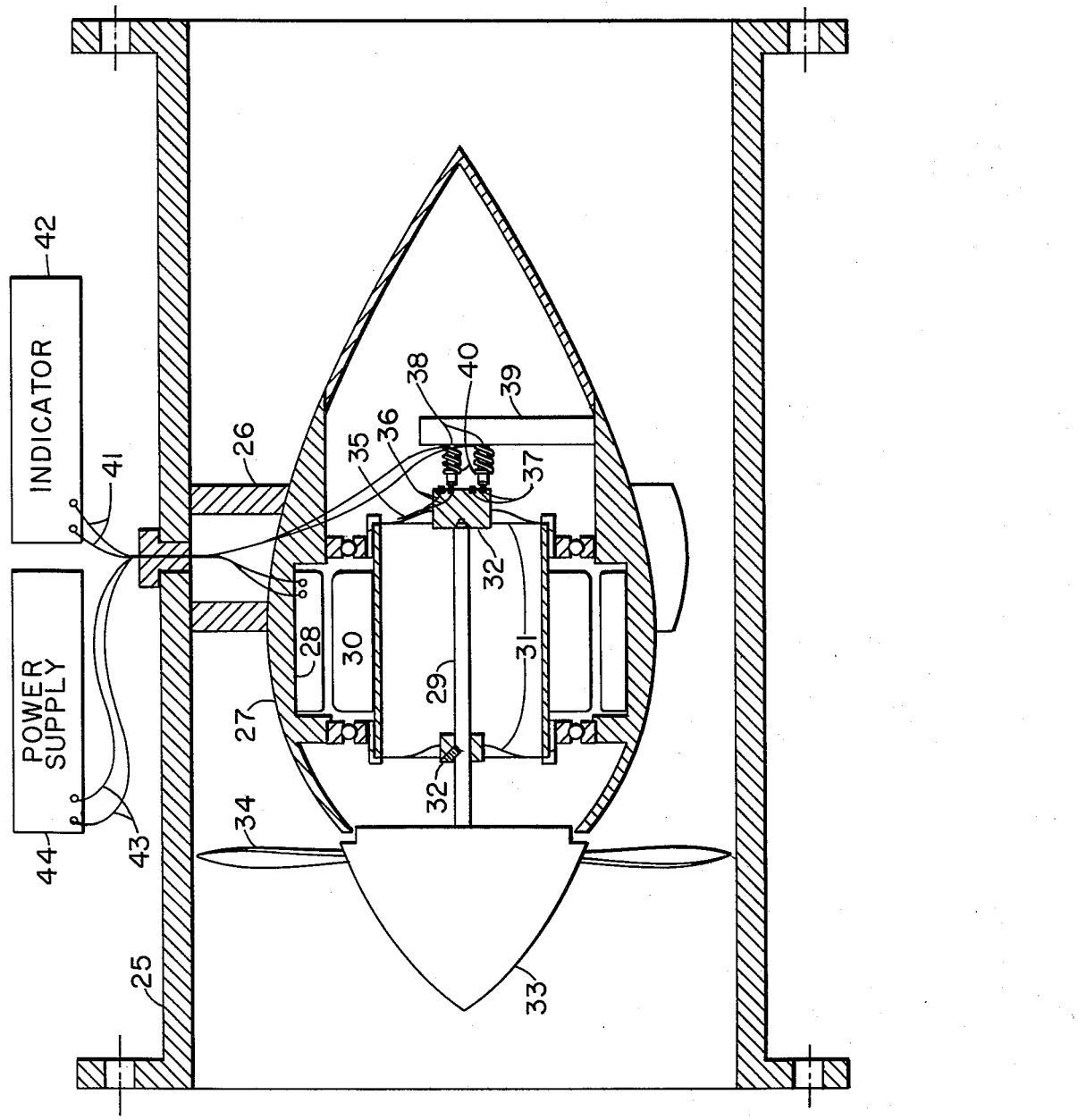

Referring to the drawings:
FIG. 1 is a perspective sectional view of a meter constructed in accordance with the present invention.
FIG. 2 is a sectional view of another form of the present invention.

The design of the present invention is based upon the principle that the lift on a system of blading rotating in a flow duct is proportional to the product of the fluid density and the fluid velocity. Therefore, any measurement of this lift force will be an indication of the mass flow since the mass flow is determined by the fluid density, the fluid velocity and the area of fluid flow. As the area of fluid flow remains constant, the mass flow is proportional to the lift forces on the blading system.

The foregoing may be expressed and demonstrated algebraically as follows:

Let:
$L$=Lift force
$R$=Impeller radius
$\Omega$=Rate of rotation of impeller
$C_L$=Coefficient of lift for impeller blades
$\rho$=Fluid density
$V$=Fluid velocity
$M$=Mass rate of fluid flow
$A$=Cross sectional area of flow
$K$=Constants
$\alpha$=Angle of attack
$S$=Area of blading
$g$=Acceleration due to gravity The mass rate of fluid flow will be equal to the product of the flow area, the fluid density and the fluid velocity. This may be expressed by formula as follows:

(1) $$M = \rho A V$$

Since the fluid flow area will be kept constant, the formula (1) may be expressed (2) $$M = K_1 \rho V$$

The angle of attack of a rotating airfoil will be approximately directly proportional to its fluid velocity and inversely proportional to the angular velocity when the angle of attack is small. This may be accomplished by maintaining high rotational speeds in relation to the fluid velocity. The foregoing relationship may be expressed (3) $$\alpha = K_2 \frac{V}{\Omega R}$$

Since R is known and will remain constant for any particular meter, Equation 3 may be written (4) $$\alpha = K_3 \frac{V}{\Omega}$$

The lift of an airfoil is commonly expressed as follows:

(5) $$L = C_L \rho S (\Omega R)^2 / 2g$$

Since the coefficient of lift is proportional to the angle of attack within the small range of the angle of attack under which this meter is to operate and knowing that the plan area of the air foil is constant, the Equation 5 may be written (6) $$L = K_4 \alpha \rho \Omega^2$$

By substituting Equation 4 in Equation 6 we have (7) $$L = K_5 \rho V \Omega$$

Therefore, from Equation 7 it can be seen that for a given fluid flow duct and a particular range of mass rate of flow that the rotational speed of the blade system should be held constant. Obviously, this design would allow a wide range of mass flow rates to be metered by a particular meter merely by adjusting the rotational speed of the blading to the most sensitive speed for the range of fluid flow to be metered.

At constant rotational speed ($\Omega$) Equation 7 shows that the lift is proportional to the mass rate of flow.

As used herein the term "aerodynamic blading" is used to mean an efficient airfoil shaped blade, the lift of which is governed by the Equation 5, see above, line 41 hereof, and in which the ratio between the coefficient of lift and the angle of attack is relatively constant from approximately 0° to 10° angle of attack.

One convenient means of measuring this lift would be a measurement of the bending moment at the blade root. This bending moment is also proportional to the mass rate of flow.

The foregoing summary of the measurement of mass rate of flow by indicating the root bending moment or the root strain in the blading system applies to systems having fixed blading. Another measurement which could be used with the fixed blade system is a force dynamometer measuring the axially directed lift force of the blading. This dyamometer, since it measures a resultant of the individual blade lift forces, will be proportional to the mass rate of flow. Obviously, with any system giving an indication proportional to mass rate of flow the total mass flow may also be indicated or recorded as desired.

Another possible configuration employing a measurement of a position rather than a force as an indicating of blade lift, thereby being an indication of mass flow rate, would be a blading system in which the individual blades are fully hinged at their roots and free to move and the axis of the shaft for the blading system is mounted vertically. In this configuration the rotation of the hinged blades away from the zero flow attitude (or coning angle) will be proportional to the blade life and also the mass rate of flow. Centrifugal force of the rotating blade system will tend to restore the blades toward their zero flow attitude.

Another configuration which is a combination and modification of the two foregoing configurations may be used to advantage. The blades of this configuration would be hinged but elastically restrained from flapping. With this configuration a flapping-hinge spring and a damper can be used to control undesirable oscillations of the output signal.

Referring more in detail to the drawings:

The flow meter is generally designated as 1 and includes flow duct 2 and mass flow sensing device 3. Flow duct 2 has flanges 4 and 5 to facilitate installation of meter 1 into any flow line in which a mass flow measurement is desired. Streamlined struts 6 provide support for sensing device 3 within flow duct 2. Struts 6 are designed to fair downstream from device 3 in order to avoid disturbance of the fluid flow past sensing device 3. Sensing device 3 is composed of hub 7, impeller blades 8, drive shaft 9, motor 10 and housing 11. Impeller blades 8 are secured to hub 7 which is secured to drive shaft 9 and rotated by motor 10. Since, as previously discussed, impeller blades 8 should be rotated at a constant speed, it is, therefore, necessary that motor 10 be a constant speed motor. As shown herein, motor 10 is illustrated as a Selsyn motor and is powered by Selsyn generator 12. Thus, impeller blades 8 will be rotated within flow duct 2 at a constant speed at all times. Motor 10 is secured within housing 11 by support brackets 13 or other suitable supporting means. Drive shaft 9 extending between motor 10 and hub 7 should be provided with a support bearing 14.

Since it is desired to measure the root bending moment of impeller blades 8 in order to have some signal indication of the mass flow, strain gages 15 should be suitably mounted at the root of each of impeller blades 8. Slip ring 16 is used to transmit the current passing through each of the strain gages 15 since the strain gages are rotating with impeller blades 8. Usually in such circumstances it is necessary to provide a pair of brushes 17 for each strain gage 15 since the measurement of the strain due to bending at the root of impeller blades 8 is in effect the measurement of the change of resistance to the flow of electric current through the strain gage itself which is proportional to the strain on the member to which it is attached. Slip ring 16 should be stationary with reference to housing 11 and may be either secured to bearing 14 or housing 11. Extending from the inner portion of slip ring 16 are wires 18 which conduct the electric current to and from strain gages 15. These wires 18 extend through housing 11, one of the struts 6, out through flow duct 2 and connect into indicator 19. Care should be taken to use a pressure seal plug 20 to seal the opening in flow duct 2 through which wire 18 extends so that the pressure of fluid within flow duct 2 will not bleed from housing 11 through struts 6. Wires 21 connect Selsyn generator 12 to motor 10 through strut 6. Indicator 19 should be of a type which averages the strain gage readings and converts them into a flow indication and puts out a signal of this flow to integrator 23. Integrator 23 converts this signal from indicator 19 into a cumulative total mass flow. Power supply 24 provides electric power for Selsyn generator 12, indicator 19 and integrator 23.

As previously mentioned, another form of the present invention whereby an indication of the mass flow rate may be obtained from the impeller blading would be to measure the thrust of the blading since this thrust would be proportional to the mass flow rate.

FIG. 2 illustrates another form of the present invention similar to that shown in FIG. 1 in that it measures the total lift of the impeller blades by providing an indication of the total thrust as transmitted to the drive shaft of the device. This flow meter is positioned in duct 25 and is supported by struts 26. Housing 27 contains motor 28 in which the shaft 29 is connected to the armature 30 of motor 28 through diaphragms 31 and collars 32. With the armature 30 rotating, diaphragms 31 and collars 32 will transmit this rotation to shaft 29 thereby causing hub 33 and blades 34 to rotate within duct 25. As has been previously shown, the thrust of blades 34 will be proportional to the lift on blades 34 and thereby proportional to the mass flow rate. In order to measure this thrust, strain gage 35 is bonded to the rear diaphragm 31 to measure the strain in diaphragm 31 caused by the thrust due to the lift of blades 34. Lead wires connect the strain gage to contact rings 37 positioned in the rearwardmost collar 32. Brush contacts 38 are held in position against contact rings 37 and are supported by bracket 39 which is secured to housing 27. Brush contacts 38 also are spring loaded by springs 40 to maintain continuous contact between brush contacts 38 and contact rings 37. Wires 41 connect brush contacts 48 to a suitable mass flow indicator 42. Wires 43 extend from a suitable power supply 44 through strut 26 to motor 28 to provide power for turning blades 34.

The variation of strain in strain gage 35 can be measured, will be proportional to the lift on blades 34 and proportional to the mass flow through duct 25. This measurement may be sent, as previously discussed, either to a suitable mass flow indicator or to a mass flow integrator to obtain total mass flow.

Thus, it may be seen that we have provided a device for measuring mass flow through a flow duct which functions by measuring an aerodynamic force on a blading system rotated in the flow duct. As has been previously mentioned, a measurement of a force which is proportional to either the lift or drag on the present blading system will be proportional to the mass flow through the blading system.

What I claim and desire to secure by Letters Patent is:

1. In a mass flow meter the combination including, a flow duct, a streamlined housing, support means mounting said streamlined housing within said flow duct, a selsyn motor mounted within said streamlined housing, a plurality of aerodynamic blades mounted within said flow duct, means connecting said selsyn motor to said plurality of aerodynamic blades whereby said selsyn motor rotates said plurality of aerodynamic blades at a constant speed within said flow duct, each of said blades being positioned to have a lift in a direction substantially opposite to the direction of fluid flow through said flow duct means sensing the aerodynamic lift forces on said blades and means transducing said forces to provide an indication of mass flow through said flow duct.

2. Invention according to claim 1 wherein said means sensing the aerodynamic lift forces on said blades comprises means sensing the bending moment at the root of said blades resulting from the aerodynamic lift on said blades.

3. Invention according to claim 2 wherein said sensing means comprises a strain gage attached to each blade root.

4. Invention according to claim 1 wherein the speed of rotation of said plurality of aerodynamic blades with reference to the flow velocity of the fluid stream flowing through said flow duct is sufficient to assure that said blades will have an angle of attack which is within the normal range of aerodynamic lift of said blades and below the angle of attack at which the blades will reach a stalling condition.

References Cited in the file of this patent

UNITED STATES PATENTS

| | | |
|---|---|---|
| 2,591,478 | Turner | Apr. 1, 1952 |
| 2,632,327 | Smith | Mar. 24, 1953 |
| 2,714,310 | Jennings | Aug. 2, 1955 |
| 2,832,218 | White | Apr. 29, 1958 |

FOREIGN PATENTS

| | | |
|---|---|---|
| 734,992 | Great Britain | Aug. 10, 1955 |